May 22, 1934.  W. J. WALDON  1,959,751
AXLE PULLER
Filed Dec. 18, 1933  2 Sheets-Sheet 1
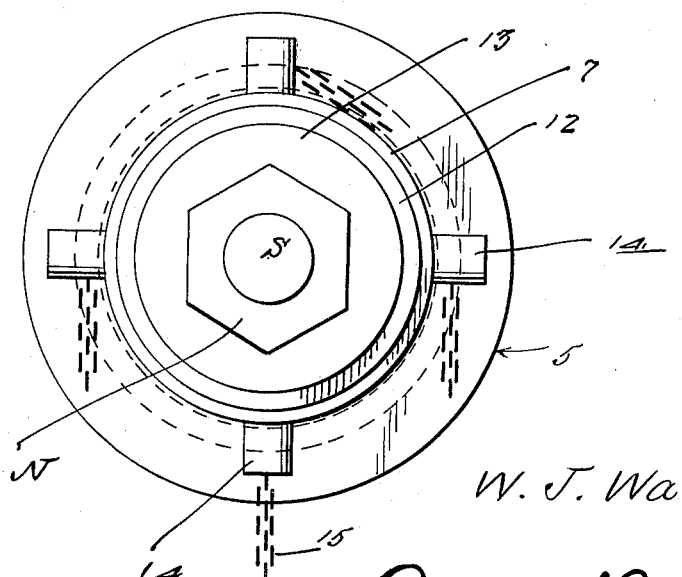
Inventor
W. J. Waldon
By Clarence A. O'Brien
Attorney

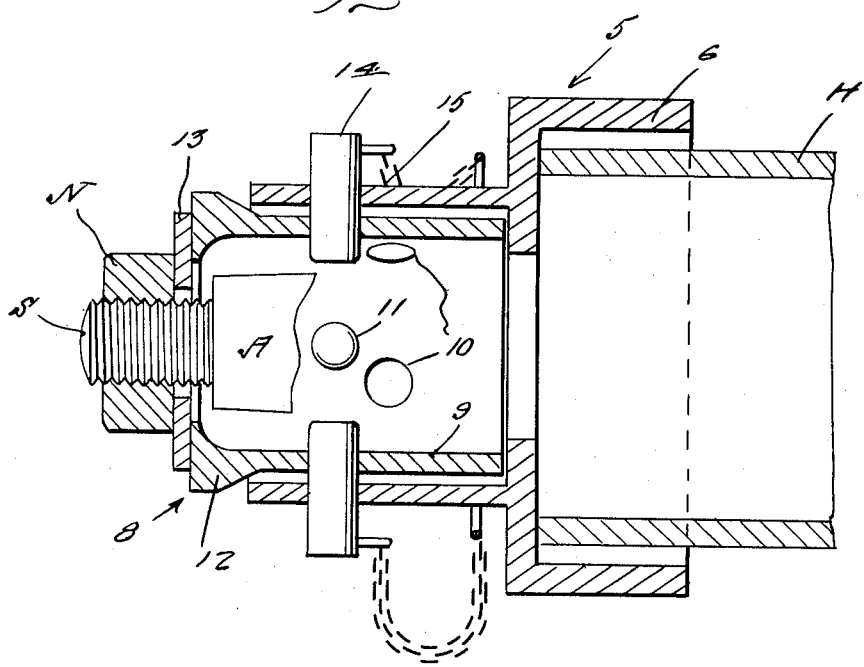
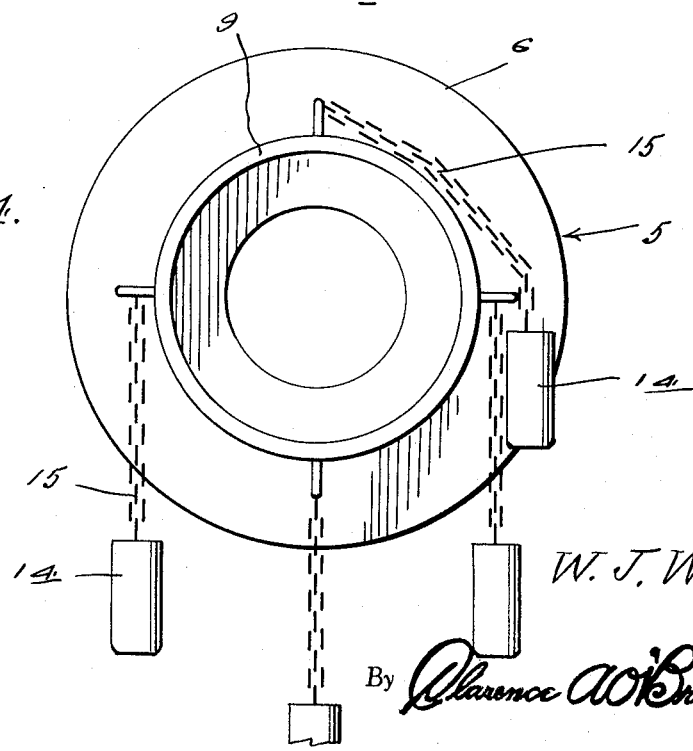

Patented May 22, 1934

1,959,751

UNITED STATES PATENT OFFICE 1,959,751

AXLE PULLER

William J. Waldon, Taft, Calif., assignor of one-fourth to J. R. Dorsey, Bakersfield, Calif.

Application December 18, 1933, Serial No. 702,999

3 Claims. (Cl. 29—85)

This invention relates to the broad class of automobile appliances and accessories and has more particular reference to a structure such as may be conveniently described as an axle puller, the same being useful in removing the rear axle of all standard makes of automobiles.

The purpose of the invention is to provide a simple and economical tool susceptible of expeditious application and removal and efficient in eliminating the danger of damage to the axle and to prevent hammering of adjacent parts in the axle housing.

Briefly, the improved appliance is characterized by two main parts, that is, a cap to fit over one end of the axle housing, said cap being provided with an accommodation and retaining socket for a companion adapter, and said adapter being constructed to fit over the axle and to transmit the stress and strain to the axle housing through the instrumentality of itself and the cap to which it is connected.

One feature of the invention is predicated upon the adoption and use of an adjustable adapter, this being of sleevelike form and having its outer end portion constructed to serve as a pressure receiving abutment, and the intermediate portion being provided with a plurality of openings provided in spaced rows to accommodate quick insertable and releasable coupling pins.

Other features and advantages will become more readily apparent from the following description and drawings.

In the drawings:

Figure 1 is an elevational view of the assembly showing the manner in which it is used.

Figure 2 is an end elevation of the same observing the parts in the direction from left to right.

Figure 3 is a view in section and elevation disclosing the construction and association of parts more explicitly.

Figure 4 is an elevational view of the attaching unit.

Referring to Figure 3, it will be observed that the letter H designates the axle housing while the letter A distinguishes the axle, S the axle stud, and N the customary retaining nut carried by said stud. The other details shown constitute the device forming the novelty of this invention.

The attaching unit 5 is characterized primarily by a cap 6 constructed to fit over the outer end of the axle housing and this cap is provided with a centralized tubular extension 7 which may be designated as an accommodation socket for the complemental unit 8. This unit 8 may be better described as an adapter and it is of sleeve-like form to fit over the axle and the sleeve portion 9 is provided with two rows of openings 10 and 11. The outer end portion of the adapter sleeve is thickened somewhat as indicated at 12 to serve as an annulus or abutment to accommodate the pressure receiving washer 13. The sleeve 9 fits adjustably and telescopically into the socket 7 and is held therein through the instrumentality of connecting or coupling pins 14. These pins are anchored on the socket through the instrumentality of chains 15 and the pins are adapted to be placed selectively in the openings 10 or 11 as the case may be. It is obvious, of course, that the socket 7 is also provided with openings to register with the holes 10 and 11 to accommodate the pins 14.

Novelty is predicated not only on the adjustable adapter sleeve 9 but also on the particular construction of the unit 5 which is characterized by the attaching and retaining cap 6 and the tubular extension 7 constituting a socket to accommodate the adapter sleeve, this socket being apertured to accommodate the locking keys or coupling pins 14 and the pins 14 being permanently anchored in place by chains to prevent loss thereof.

In practice, it is obvious that after the wheel is removed the cap 6 is placed over the axle housing as shown in Figure 3. The nut N is removed and the adapter sleeve is slipped over the axle and telescoped into the socket 7. It is locked in the desired adjusted position through the instrumentality of the co-acting coupling pins 14 and openings 10 or 11 as the case may be. A wear and pressure receiving washer 13 is placed over the threaded stud and the nut N is replaced and turned in an obvious manner to produce a pull on the axle so that it is loosened for subsequent bodily removal.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

I claim:

1. An axle removing device of the class described comprising an attaching and retaining device embodying a cap to fit over one end of an axle housing, an axle adapter sleeve adapted to slip over the threaded end portion of the axle, the outer end of said sleeve being fashioned with an abutment to receive pressure from a nut on the threaded end of the axle which is adapted to be tightened thereagainst, and adjustable means operatively connecting said adapter to said cap.

2. A device of the class described comprising a cap adapted to fit removably over one end of an axle housing, said cap being formed with a central tubular extension defining an adapter receiving socket, an adapter element constructed to fit over the threaded end of an axle, said element fitting telescopically into said socket, and said adapter element being provided with a shoulder forming an abutment for a pressure producing nut and adjustable connecting means between the socket and adapter element.

3. An axle puller of the class described comprising a cap to fit over one end portion of the axle housing, said cap being provided with a tubular extension formed with apertures, coupling pins chained to said extension and adapted to be removably inserted in said apertures, an adapter sleeve to slip over the threaded end of an axle, said sleeve being proportioned to fit telescopically into said tubular extension and having apertures for selective reception of the inner ends of said pins, the outer end portion of said sleeve being thickened to provide a pressure nut contacting abutment.

WILLIAM J. WALDON.